(12) United States Patent
King (10) Patent No.: US 11,447,406 B2
(45) Date of Patent: *Sep. 20, 2022

(54) MULTI-STAGE DISPENSERS

(71) Applicant: KING TECHNOLOGY INC., Hopkins, MN (US)

(72) Inventor: Joseph A. King, Wayzata, MN (US)

(73) Assignee: KING TECHNOLOGY, INC., Hopkins, MN (US)

( * ) Notice: Subject to any disclaimer, the term of this patent is extended or adjusted under 35 U.S.C. 154(b) by 29 days.

This patent is subject to a terminal disclaimer.

(21) Appl. No.: 16/974,173

(22) Filed: Oct. 30, 2020

(65) Prior Publication Data

US 2021/0078880 A1 Mar. 18, 2021

Related U.S. Application Data

(62) Division of application No. 15/932,664, filed on Apr. 3, 2018, now Pat. No. 10,875,797, which is a division of application No. 13/998,870, filed on Dec. 16, 2013, now Pat. No. 10,029,931.

(60) Provisional application No. 61/848,145, filed on Dec. 24, 2012.

(51) Int. Cl.
| | |
|---|---|
| *C02F 1/68* | (2006.01) |
| *B01F 33/50* | (2022.01) |
| *C02F 1/76* | (2006.01) |
| *C02F 1/50* | (2006.01) |
| *E04H 4/12* | (2006.01) |
| *B01F 21/20* | (2022.01) |
| *B01F 33/503* | (2022.01) |
| *C02F 103/42* | (2006.01) |

(52) U.S. Cl.
CPC .............. *C02F 1/685* (2013.01); *B01F 21/22* (2022.01); *B01F 33/503* (2022.01); *C02F 1/688* (2013.01); *C02F 1/505* (2013.01); *C02F 1/76* (2013.01); *C02F 2103/42* (2013.01); *C02F 2201/006* (2013.01); *C02F 2209/01* (2013.01); *E04H 4/1281* (2013.01)

(58) Field of Classification Search
CPC .......... C02F 1/685; C02F 1/688; C02F 1/505; C02F 1/76; C02F 2103/42; C02F 2201/006; C02F 2209/01; B01F 21/22; B01F 33/503; E04H 4/1281
USPC ........... 210/167.11, 749, 753, 754, 755, 756, 210/242.1; 422/265
See application file for complete search history.

(56) References Cited

U.S. PATENT DOCUMENTS

| | | | | | |
|---|---|---|---|---|---|
| 4,630,634 | A | * | 12/1986 | Sasaki | ...................... C02F 1/688 D23/207 |
| 6,432,371 | B1 | * | 8/2002 | Oliver, Jr. | ............... C02F 1/688 210/242.1 |
| 6,562,243 | B2 | * | 5/2003 | Sherman | .................... C02F 1/72 210/764 |

(Continued)

*Primary Examiner* — Fred Prince
(74) *Attorney, Agent, or Firm* — Johnson & Phung LLC (57) ABSTRACT

A multi-stage floatation dispenser for carrying a ballast, which may be a non-water consumable dispersant and at least one water consumable dispersant wherein the weight of the water consumable dispersant decreases as the water consumable dispersant is consumed with the weight of water consumable dispersant and the non-water consumable coordinated with the flotation capacity of a flotation dispenser to provide for either a two stage or a three stage dispensing mode.

3 Claims, 5 Drawing Sheets

(56) References Cited

U.S. PATENT DOCUMENTS

| | | | |
|---|---|---|---|
| 7,347,934 B2* | 3/2008 | King | C02F 1/505 |
| | | | 210/206 |
| 8,123,956 B2* | 2/2012 | King | C02F 1/008 |
| | | | 210/764 |
| 9,039,903 B2* | 5/2015 | King | B01F 21/22 |
| | | | 210/764 |
| 2004/0175311 A1* | 9/2004 | Cormier | A61L 2/23 |
| | | | 422/40 |
| 2007/0119761 A1* | 5/2007 | King | E04H 4/1281 |
| | | | 210/198.1 |
| 2014/0110352 A1* | 4/2014 | King | C02F 1/688 |
| | | | 222/173 |

* cited by examiner

MULTI-STAGE DISPENSERS

CROSS REFERENCE TO RELATED APPLICATIONS

This application is a divisional application of patent application Ser. No. 15/932,664 filed Apr. 3, 2018 titled Multi-Stage Dispensers (pending), which is a divisional application of patent application Ser. No. 13/998,870 filed Dec. 16, 2013 titled Multi-Stage Dispensers (now U.S. Pat. No. 10,029,931), which claims priority from U.S. provisional application 61/848,145 filed Dec. 24, 2012.

STATEMENT REGARDING FEDERALLY SPONSORED RESEARCH OR DEVELOPMENT

None

REFERENCE TO A MICROFICHE APPENDIX

None

BACKGROUND OF THE INVENTION

The concept of a floating dispenser for continually delivering water chemical treatment to a body of water is known in the art. Typically, a flotation dispenser carries a water chemical, which is dissipated from the dispenser as the dispenser floats in the body of water. In some cases the dispenser tips on its side when the water chemical has been consumed and in other cases the dispenser is removed after a period of time. In still other cases additional water chemical is added to the dispenser based on how high the dispenser floats in the body of water.

SUMMARY OF THE INVENTION

Briefly, the invention comprises a multi-stage floatation dispenser for carrying a ballast, which may be a non-water consumable dispersant, and at least one replaceable cartridge wherein the replaceable cartridge contains a water consumable dispersant wherein the weight of the water consumable dispersant decreases as the water consumable dispersant is consumed.

In two-stage mode information is provided by the position of the flotation dispenser with respect to a water line. Information on an intermediate dispensed condition or a dispensed condition of the water consumable dispersant, is determined by an internal torque on the flotation dispenser, which is caused by the relationship of the weight of the ballast to the weight of water consumable dispersant, which is located along an axis of the flotation dispenser. In the two-stage mode the information on the status of the water consumable dispersant is transmittable to an observer by the rotational orientation of the flotation dispenser with respect to a water line.

In the three-stage mode additional information is provided by the vertical position of the flotation dispenser with respect to a water line. In the first stage of the three-stage mode the initial position of the flotation dispenser is below the water line. The submersion of the flotation dispenser occurs when the initial weight of the cartridges and the water consumable dispersants and the non-water consumable dispersants i.e. contents of the flotation dispenser is in excess of the buoyancy force of the flotation dispenser. As the water consumable dispersant is consumed the initial weight of water consumable dispersant weight decreases reaching a point where the buoyancy force of the flotation becomes greater than the contents of the flotation dispenser. This is the second-stage where the flotation dispenser appears above a water line and floats in a first orientation. In the third-stage the relationship of the weight of the water consumable dispersant to the ballast provides further information on the status of the water consumable dispersant in the flotation dispenser though rotation of the floatation dispenser from the first orientation to a second orientation. Consequently, the weight of the replaceable cartridge in relationship to the buoyancy force of the flotation of the dispenser as well as the ratio of the weight of the ballast to the weight of water consumable dispersant can be used to provide information on an initial stage, an intermediate stage and a final stage of the water consumable dispersant in the cartridge. This feature can also be used to allow the flotation dispenser to dispense one or more water consumable dispersants and provide visual information on the status of each dispersant. A further feature of the invention is that the same flotation dispenser may be used with one set of dispersants in a two-stage mode or with another set of dispersants in a three-stage mode through selection of the appropriate replaceable cartridge.

DESCRIPTION OF THE PREFERRED EMBODIMENT

Figure 1:
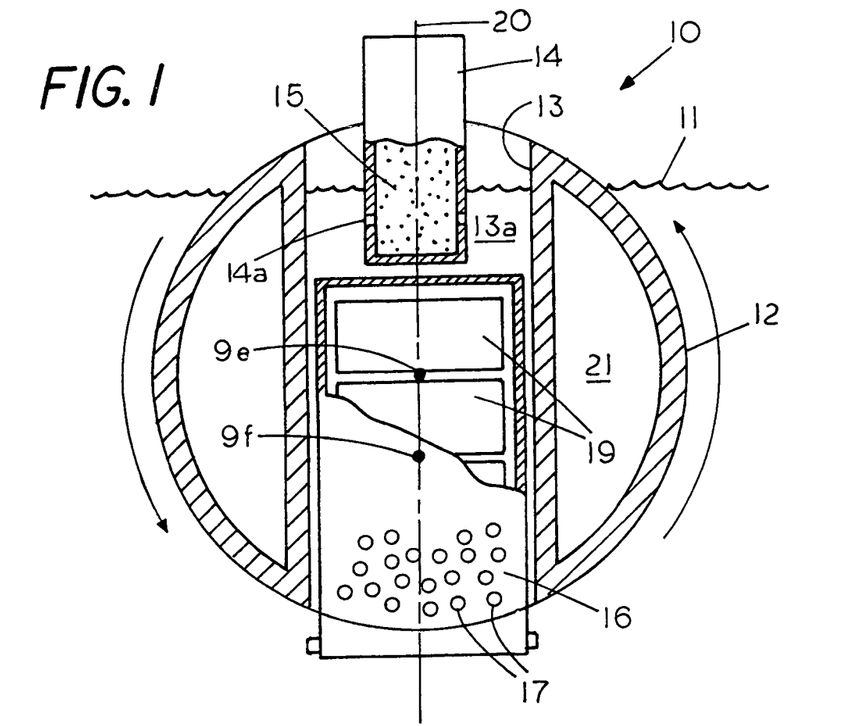
FIG. 1 is a cross sectional view of a flotation dispenser.

FIG. 1 shows a spherical shaped flotation dispenser 10 floating partially above a water line 11 and partially below the water line 11. In the example shown a housing comprising a spherical shaped shell 12 has a central vertical flotation axis 20 extending vertically through the flotation dispenser 10. A cylindrical sleeve 13 having a cylindrical opening or cylindrical passage 13a extends along the central flotation axis 20 to provide water access to dispersants located within cartridge 14 and cartridge 16 that are both carried in cylindrical sleeve 13. Located radially outward from the central flotation axis 20 is an annular flotation chamber 21 that provides buoyancy to the flotation dispenser 10 with the buoyancy sufficient to support dispenser cartridge 14 having water ports 14a and dispenser cartridge 16 having water ports 17 when each of the dispenser cartridges 14 are in a full condition. First container or cartridge 14 is located in the top portion of cylindrical opening 13a with cartridge 14 having water access ports 14a located below a water line 11. In this example cartridge 14 contains a non-consumable water dispersant 15 that retains its mass or weight as it releases a dispersant such as metal ions into the body of water. An example of such a non-consumable water dispersant that retains its mass or weight is a mineral that releases metal ions such as copper ions, silver ions or zinc ions when placed in a body of water. One example of a non-consumable water dispersant is shown and described in U.S. Pat. No. 6,217,892, however, other non-consumable water dispersants may be used without departing from the spirit and scope of the invention. The second container or replaceable cartridge 16 contains a further dispersant which is a water consumable dispersant 19 that losses its mass or weight when in contact with the body of water. An example of a water consumable dispersant 19 is a halogen, for example bromine or chlorine although other water consumable dispersants may be used without departing from the spirit and scope of the invention. In this example the first container or dispensing cartridge 14 and the second container or dispensing cartridge 16 are centrally located within the housing and along the central flotation axis 20 with the non water consumable dispersant 15 and the water consumable dispersant 19 having a specific of gravity greater than one with the weight of the water consumable water dispersant 19 exceeding the weight of the non water consumable dispersant 15 so that flotation dispenser 10 has a bottom heavy condition causing the floatation dispenser 10 with the dispensing cartridges 14 and 16 therein to float in a first orientation as shown in FIG. 1. FIG. 1 also shows flotation dispenser 10 having a center of gravity $g_e$ located along the flotation axis 20 when the dispensing cartridge 16 is in an empty condition i.e. when no water consumable dispersants are in the dispensing cartridge 16 and a center of gravity $9_f$ located along the flotation axis 20 and below the center of gravity $9_e$ when the water consumable dispersants 19 is present in dispensing cartridge 16. When the center of gravity $9_f$ of is below the center of gravity $g_e$ the flotation dispenser 10 floats in a bottom heavy state illustrated in FIG. 1, i.e. when the water consumable dispersant 19 in cartridge 16 is in an undispersed or unconsumed state.

In the bottom heavy condition shown in FIG. 1 the weight of the non-water consumable dispersant 15 in the upper cartridge 14 remains constant, and the water consumable dispersant 19 comprise a material whose mass and weight dissipates after placement into a body of water. However, initially the cartridges 14 and 16 have a combined weight which is less than the buoyancy force of the flotation dispenser 10 thereby enabling the flotation dispenser 10 to floatingly support itself together with the cartridge 14 and dispersant 15 and the cartridge 16 and water consumable dispersant 19. In this example the flotation dispenser 10 floats in a first vertical orientation when the water consumable dispersant 19 is an unconsumed condition since the weight of the consumable dispersant 19 creates a bottom heavy condition as shown in FIG. 1. The flotation dispenser 10 reverses its orientation 180 degrees to support the flotation dispenser 10 in a second orientation when the water consumable dispersant 19 in the second cartridge 16 has been consumed as the weight of the dispersant 15 becomes heavier than the water consumable dispersant 19. The arrows indicate the rotation of the flotation dispenser 10 as the center of gravity $9_f$ of the flotation dispenser 10 changes to a position proximate the first cartridge, which causes the flotation dispenser to invert 180 degrees in response to the dissipation of the water consumable dispersant 19 therein.

In this example the initial weight of the water consumable dispersant 19 and cartridge 16 is greater than the weight of the non-water consumable dispersant 15 and dispenser cartridge 14 with both cartridges 14 and 16 floatingly supported in the housing or shell 12. That is, when the water consumable dispersant 19 in cartridge 16 is an unspent condition the flotation dispenser 10 floats in a first orientation as shown in FIG. 1 to allow water access to the dispersants carried by the flotation dispenser 10.

The utilization of a spherical shaped flotation dispenser 12 with an annular flotation chamber 21 creates a flotation collar that allows one to maximize the buoyancy force and maintain a small profile for the dispenser yet permit the dispenser to float in a first orientation when a dispersant is unspent and to rotate to a second orientation when the dispersant is spent or consumed, however other shapes may be used without departing from the spirit and scope of the invention.

Figure 2:
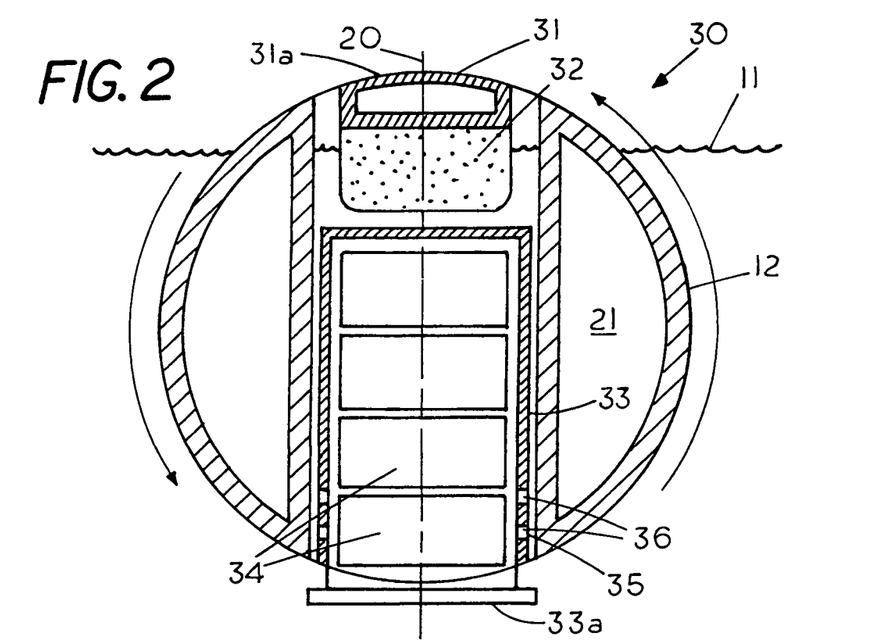
FIG. 2 is a cross sectional view of another flotation dispenser.

FIG. 2 is a cross sectional view of another flotation dispenser 30 similar to the flotation dispenser of FIG. 1 except the cartridge 31, which contains a ballast 32 that may or may not be a water conditioning material, is located with its exterior surface 31a following the spherical contour of shell 12. An example of a ballast, which is a non-water consumable dispersant, that also releases a water conditioning material is a source of metal ions. Typically, it is preferred to use a source of metal ions that releases a zinc ion, a silver ion or a copper ion since such sources of metal ions maintain the weight of the source of metal ions during the release of the metal ions into the body of water. In the example shown in FIG. 2 the ballast or source of metal ions 32 is carried by a further cartridge 32 with the further cartridge 32 located below a water line when the flotation dispenser 30 floats in the body of water to thereby enable metal ions to be released into the body of water.

While the flotation dispenser 10 of FIG. 2 may be used to simultaneously deliver two or more dispersants the flotation dispenser 30 may also be used to deliver only a single dispersant if the top cartridge 31 contains an inert ballast 32 that lacks any water conditioning features. In such cases the ballast may be formed as a permanent part of the flotation collar 12. As used herein water-conditioning features refers to a water consumable or non water consumable material that has an effect on the characteristics of the water as the water characteristics relates to the comfort and convenience for persons submerging themselves for example in pools, spas and hot tubs.

In the example shown in FIG. 2 the lower cartridge 33 is shown extending partially out of the flotation dispenser 30 with halogen pucks 34 stacked vertically therein. A stand 33a on the bottom of cartridge 33 allows the spherical shaped flotation dispenser 30 to be placed on a shelf or the like prior to use without fear of the flotation dispenser accidentally rolling off the shelf. In this example the cartridge dispenser 30 floats in the condition shown in FIG. 2 when the flotation dispenser is initially placed in a body of water. As the water consumable dispersant 34 therein is consumed or dispersed into the body of water the center of gravity of the flotation dispenser moves upward along axis 20 creating a torque on the flotation dispenser 30 causing the flotation dispenser to rotate as illustrated by the arrows. That is, a gravitational torque exerted by a ratio of the water consumable dispersant to the ballast unbalances the forces on the flotation dispenser 30 sufficiently to make the floatation dispenser top heavy thereby causing the flotation dispenser to rotate from a first orientation as shown in FIG. 2 to a second orientation 180 degrees opposite to thereby alert an operator that a dispenser cartridge 33 needs to be replaced. Thus, as the water consumable dispersant 34 is gradually consumed the flotation dispenser 30 will eventually invert 180 degrees (see arrows) so that the bottom if the flotation dispenser 30, which was below the water line 11, becomes visible above the water line 11 thus providing a visual signal to an operator that the water consumable dispersant 34 in cartridge 33 is in a spent condition i.e. water consumable dispersant needs to be replenished.

Figure 3:
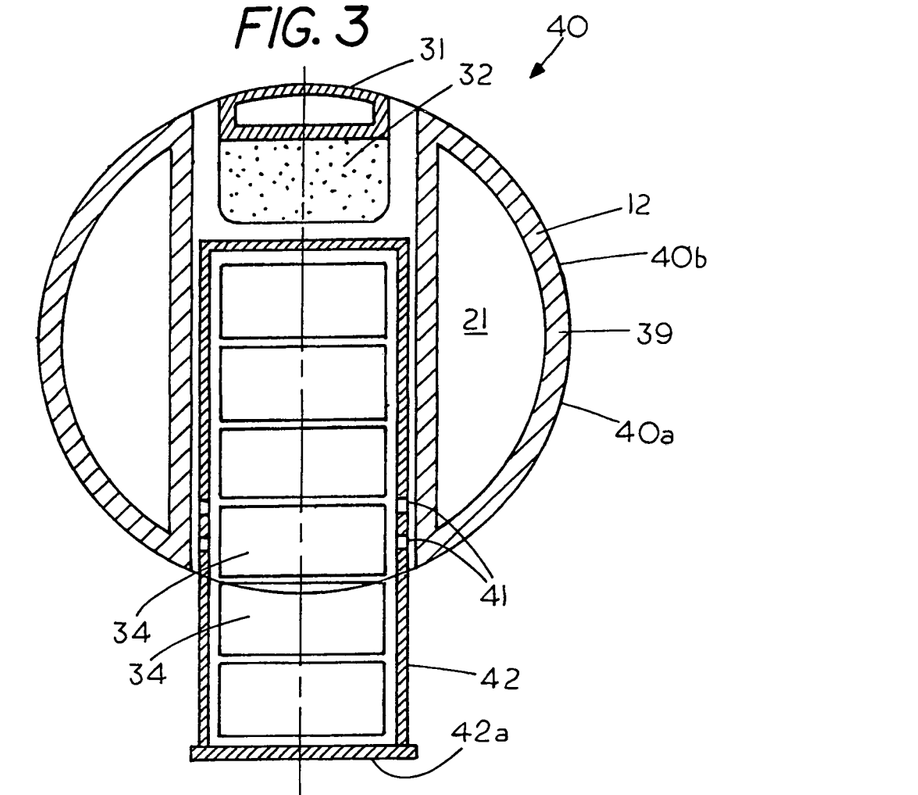
FIG. 3 is a cross sectional view of a three-stage flotation dispenser.

FIG. 3 is a cross sectional view of a three-stage flotation dispenser 40 having a flotation collar 39 with an annular flotation chamber 21 therein. Dispenser 40 is similar to dispenser 30 except the flotation dispenser 40 includes an elongated replaceable cartridge 42, which has a greater length and greater weight than cartridge dispenser 33, since cartridge dispenser 41 contains additional halogen pucks 34. A set of ports 41 allow water to enter dispensing cartridge 42 and come into contact with the consumable water dispersant 34.

In this example the use of a dispenser cartridge 42 with additional halogen pucks 34 increases the weight of the second dispenser cartridge 42 sufficiently so that that the weight of cartridges 31 and 42 overcomes the buoyancy force of the flotation chamber 21 thereby causing the dispenser 40 to sink to the bottom of the body of water and remain in the bottom in an out of the way condition. When sufficient water consumable dispersant in dispenser cartridge 42 has been consumed it lessens the weight carried by the flotation dispenser 40 to a point where the buoyancy force of the flotation dispenser 40 is sufficient to floatingly support both dispenser cartridge 31 and its contents as well as dispenser 42 and its contents. When the flotation dispenser floats to the top of the body of water the flotation dispenser 40 is at least partially visible above the water line 11, as illustrated in FIG. 5.

Figure 4:
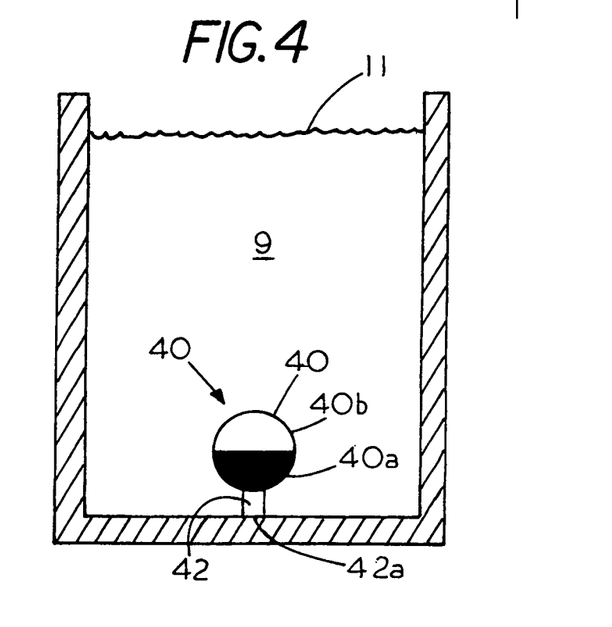
FIG. 4 is a view of a body of water with the three-stage flotation dispenser of FIG. 3 located at the bottom of the body of water.

In this example, the amount of halogen 34 (i.e. the water consumable dispersant in the cartridge 42) may be selected such that when the halogen 34 is in an unspent condition the cartridge 42 and the flotation dispensers 40 sink to the bottom of the body of water as shown in FIG. 4, however, once the halogen has been partially consumed the flotation dispenser rises to the top of the pool (see FIG. 5) and floats in an upright condition as the further dispersant (i.e. halogen) continues to dissipate. One may select a dispersant consumption state at which the flotation dispenser 40 rises from the bottom to correspond to the amount of water consumable dispersant 34 remaining in the dispenser cartridge 42. For example, one may select a condition where the halogen in dispensing cartridge 42 is 60% consumed as the condition where the flotation dispenser 40 rises so that if floats at least partially above the water line 11. Thus, when the flotation dispenser 40 surfaces the operator will know that the dispenser cartridge 41 does not have to be immediately replaced but will soon need to be replaced.

Figure 5:
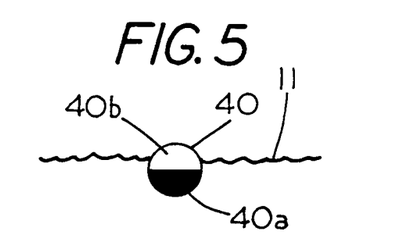
FIG. 5 is a view of a body of water with the three-stage flotation dispenser of FIG. 3 floating in a first orientation in the body of water.
Figure 6:
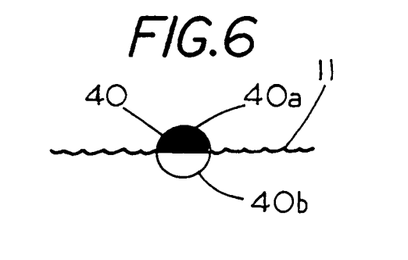
FIG. 6 is a view of a body of water with the three-stage flotation dispenser of FIG. 3 floating in a second orientation in the body of water.

FIG. 4, FIG. 5 and FIG. 6 show the three-stage flotation dispenser 40 of FIG. 3 in relation to a water line 11 of a body of water 9. Flotation dispenser 40 has a light color 40b on one hemispherical end of flotation dispenser 40 and a dark color 40a on the opposite hemispherical end of flotation dispenser 40 with the colors visually contrastable with each other when the flotation dispenser 40 floats in a body of water to enable an operator to visually determine which end of the flotation dispenser 40 is above the water line and which end of the flotation dispenser 40 is below the water line.

In the first dispensing stage the flotation dispenser 40 is located at the bottom of the body of water 9 (FIG. 4) with the light color end 40b of flotation dispenser located above the dark color end 40a end of the flotation dispenser and the cartridge extension bottom 42a resting on the bottom of the pool 11. In the first dispensing stage the water consumable dispersant, namely the halogen dispersant in the elongated protruding dispensing cartridge 42 is in an unspent or unconsumed condition. Once the halogen dispersant in cartridge 42 begins to dissipate the buoyancy of the flotation dispenser 40 becomes sufficient to lift the dispenser 40 to a flotation or second stage condition as illustrated in FIG. 5. Note, in this example the extension 42 is a vertically collapsible cartridge that collapses as the dispersant therein is consumed, however, a non-collapsible cartridge may be used without departing from the spirit and scope of the invention. In addition one may wish to size the cartridge 42 sufficiently small so the cartridge 42 fits within the shell yet when filled with water consumable dispersant causes the flotation dispenser 40 to sink when initially placed in a body of water.

In the second stage (see FIG. 5) the dispenser 40 floats in a first orientation with the light color end 40b of flotation dispenser 40 facing upward since the decrease in weight of the water consumable dispersant in dispenser cartridge 42 through release of the dispersant into the body of water is sufficient to cause the flotation dispenser 40 to rise but insufficient to generate a torque that would cause the center of gravity of the flotation dispenser to shift sufficiently to rotate the flotation dispenser 180 degrees.

Thus, FIG. 5 shows the flotation dispenser 40 floating in the body of water in the second stage of the three dispensing stages and FIG. 6 shows the flotation dispenser 40 floating in the body of water in the third dispensing stage. In the second dispensing stage or intermediate dispersant condition, as shown in FIG. 5 the lower halogen water consumable dispersant 34 is being dispersed into the body of water as the flotation dispenser 40 floats in the body of water. However, as the weight of the non-water consumable dispersant 32 remains constant while the weight of water consumable dispersant therein continues to decrease the flotation disperser 40 inverts as shown in FIG. 6 which has been heretofore described in relation to flotation dispenser 20 and flotation disperser 30. The change of orientation of flotation dispenser 40 in FIG. 6 is indicated by the light color end 40b of flotation dispenser 40 located below the water line 11 and the dark color end 40a of flotation dispenser 40 located above the water line 11. The color 40b and color 40a are visually contrasting colors that enable a person to quickly determine which end of the flotation dispenser 40 is above the water line and which is below the water line to thereby let the user know whether the dispensing cartridge 42 in flotation dispenser 40 should or should not be replaced. Thus the three-stage dispenser 40 can be used to indicate an initial dispersant condition, an intermediate dispersant condition as well as a dispersant replace condition. While the use of different colors on the opposite ends of the flotation dispenser 40 has been shown other contrasting features such as structural features may be used to provide an indication to an operator of the orientation of the flotation dispenser as well as the amount of dispersant remaining without departing from the spirit and scope of the invention.

Figure 7:
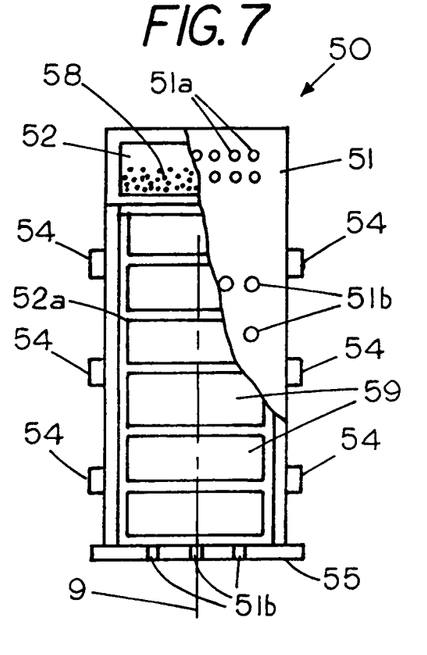
FIG. 7 is a partial cutaway view of a dispensing cartridge.

FIG. 7 is a partial cutaway view of one example of a replaceable dispenser cartridge 50 for use in a flotation dispenser 40 (FIG. 3 and FIG. 8A) where the dispenser cartridge 50 contains both a water consumable dispersant 59 and a non-water consumable dispersant 52*a*. Dispenser cartridge 50 includes a cylindrical housing 51 with a first internal compartment 52*a* containing a stack of water consumable halogen pucks 59 and a second internal compartment 52 containing a non-water consumable mineral dispersant 58 with the compartments 52 and 52*a* located in axial alignment with each other along a central axis 9. While large diameter halogen pucks 59 are shown the halogen usable in the dispenser cartridge 50 may be in other shapes and sizes without departing from the spirit and scope of the invention.

Figure 9:
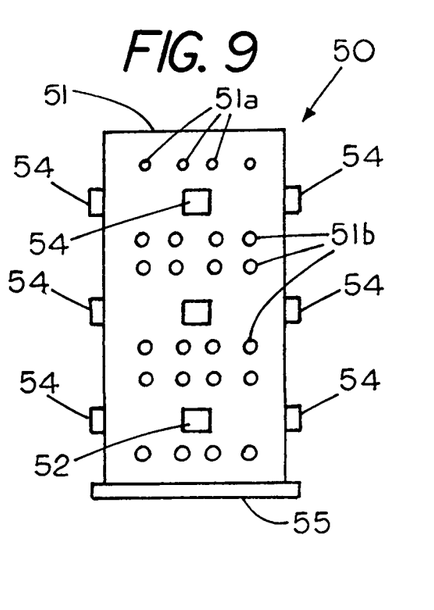
FIG. 9 is a front view of an alternate embodiment of a dispenser cartridge for placement in a floatation dispenser.

FIG. 9 shows a front view of the dispenser cartridge 50 revealing circumferentially spaced fluid ports 51*a* and 51*b* that provide for ingress and egress of water into the dispenser cartridge 50 compartments 52 and 52*a* causing water release of the dispersant into a body of water proximate the dispenser cartridge 50. In operation of cartridge 50 water contacts the water consumable dispersant 59 through the openings 51*b* and contacts the non-consumable dispersant 58 through the openings 51*a*. The water contact with the dispersants releases the dispersants, for example metal ions such as silver, copper or zinc ions and a halogen such as chlorine or bromine, into the body of water proximate the dispensing cartridge 50.

Figure 8:
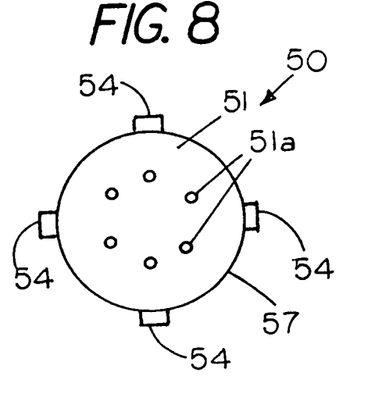
FIG. 8 is a top view of the dispensing cartridge of FIG. 7.
Figure 8A:
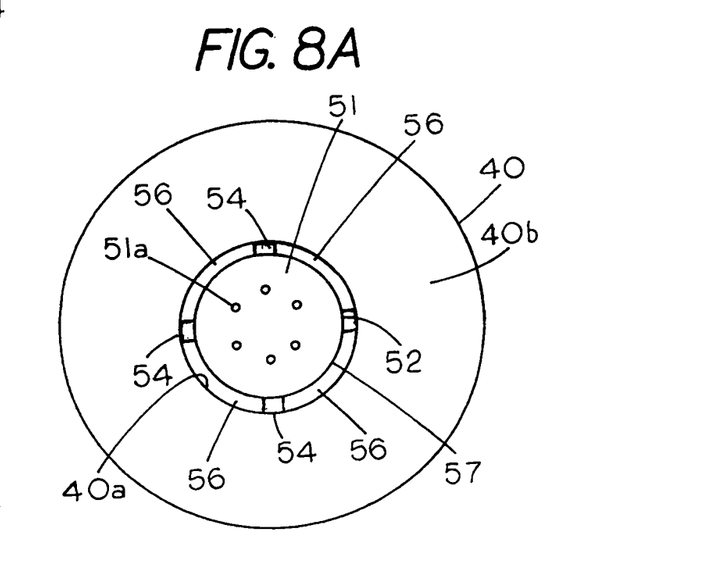
FIG. 8A is a top view of the dispensing cartridge of FIG. 7 located therein.

FIG. 8 and FIG. 8A show a top view of dispensing cartridge 50 revealing the set of radial spacers 54 or extensions that are circumferentially spaced and extend radially outward from cylindrical surface 57 for purposes of holding the cartridge 50 in a spaced condition from a cylindrical wall 40*a* within the flotation collar 40. FIG. 8A shows that when cartridge 50 is centrally positioned with the cylindrical sidewall 57 the cartridge 51 and the flotation collar 40 coact to form a set of four axial water passages 56 located between the spacers 54. As shown by the FIG. 8A top view of the dispenser cartridge 50 and flotation dispenser 40 the spacers 54 maintain the dispensing cartridge 50 in a central position within floatation dispenser 40. The spacers 54 create a set of four axial fluid passages 56 between sidewall 40*a* and sidewall 57, which allows the water supporting the flotation dispenser 40 to enter the underwater portion of the flotation dispenser 40 and release the dispersants within the dispensing cartridge 50 into the body of water supporting the flotation dispenser 40 as the water enters the dispensing cartridges through the side ports 51*a* and 51*b*. That is, when the flotation collar 40 floats with a top portion above a water line the axial fluid passages 56 allow water to flow axially back and forth below the water line along the outside of the dispenser cartridge 50 as well as radially into the dispenser cartridge 50 where the water contacts the dispersant 58 within the compartment 52 and the dispersant 59 within compartment 52*a*. The water contact with the dispersants therein occurs as the flotation dispenser 40 and dispenser cartridge 50 float in a conjoined condition in a body of water as the flotation dispenser 40 maintain the water ports 51*b* and at least some or all of the water ports 51*a* of the dispenser cartridge 50 below the water line thereby allowing water to freely come into contact with the dispersants in the dispenser cartridge compartments 52 and 52*a*.

In some embodiments the dispensing cartridge 50 may extend through the flotation collar and in other examples the dispensing cartridge 50 may extend only partially through the flotation dispenser, however, with the center of mass of the non consumable dispersants located above a geometric center of the flotation collar and the consumable dispersants located below the geometric center of the flotation collar the torque on the flotation dispenser 40 generated though the change in buoyancy forces can be used to rotate the flotation dispenser 40 from a first condition to a second condition as illustrated in FIG. 5 and FIG. 6. Preferably, the flotation dispenser 40 is flotationally balanced i.e. sphere like so that flotation dispenser 40 can float in first condition where the torque generated by the consuming of the consumable dispersant is sufficient to rotate the flotation dispenser 40 from the first condition to a second condition to reveal a visual marking on the flotation dispenser 40 to provide a viewer with an indication of the status of the consumable dispersant in the dispensing cartridge 50, which is fixedly supported in the flotation dispenser 40. However, other shapes may be used without departing from the spirit and scope of the invention. In the example of FIG. 1 two separate dispensing cartridges are used to hold the water-soluble dispersant and the non-water soluble dispersant which allows a separate replacement of the cartridge with the water consumable dispersant while retaining the cartridge with the non-water soluble water dispersant therein. In the example of FIG. 7 a single dispensing cartridge 50 supports both the water consumable dispersant and the non-water consumable dispersant so that when the cartridge 50 is replaced both the water soluble dispersant and the non-water soluble dispersants are replaced. A feature of the invention is that through selection of one or two cartridges one can match consumption criteria. For example, with some water-soluble dispersants the water soluble dispersant will last for a season and then be recycled or discarded at the end of the season. In those applications a single cartridge may be preferred while the floatation dispenser is reused. In other cases where the water consumable dispersant dissipates more rapidly it may be preferred to use two or more cartridges with at least one of the cartridges replaceable after the water soluble dispersant therein has been consumed. In still other cases it may be preferred that both the cartridges and the floatation dispenser are recycled or discarded after one of the dispersants therein has been consumed.

Figures 10, 11:
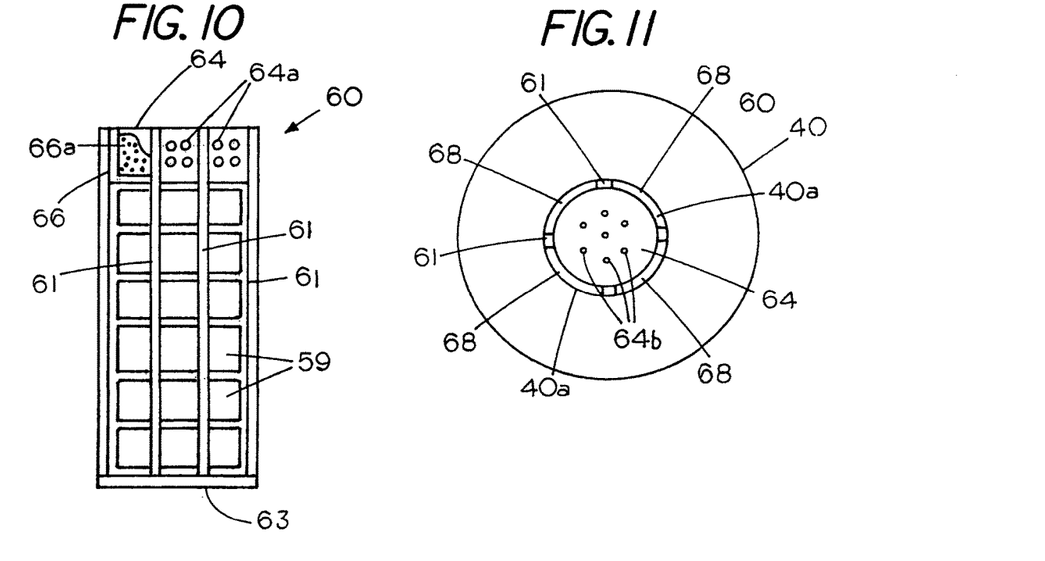
FIG. 10 is a front view of another embodiment of a dispenser cartridge for placement in a floatation dispenser.
FIG. 11 is a top view of a flotation dispenser with the dispenser cartridge of FIG. 10 located therein.

FIG. 10 shows an alternate embodiment of a replaceable dispenser cartridge 60 wherein the consumable dispersant comprises a set of halogen pucks 59 maintained in a stacked relationship within an open sided cartridge 60 having a set of vertical ribs 61 for restraining the consumable dispersant therein. In this example one end of the vertical ribs 61 engages the cartridge bottom 63 and the other end engages the dispersant housing 64, which contains a set of opening 64*a* to allow water to obtain access to the non-consumable dispersant 66*a* in dispenser compartment 66. FIG. 11 illustrates the cooperative relationship between floatation dispenser 40 and the dispenser cartridge 60 with a set of axial fluid passageways 68 located proximate the dispenser cartridge 60 to enable water contact with the dispersants therein when the dispenser cartridge 60 is supported in the water by floatation dispenser 40. In the example shown the mineral dispenser compartment 66 is located at the top end of the cartridge 60 and the cartridge extends complete through the flotation dispenser 40 to provide a maxim rotational torque on the flotation dispenser 40 when the halogen is consumed. In some instance the mineral dispenser compartment 66 may be located below the top end but above the geometrical center of the dispenser cartridge 60 since a maximum rotational forces may not be required. In still other cases one may use the axial positioning of the dispenser cartridge 60 to establish an equilibrium point where the weight of the remaining consumable dispersant is insufficient to prevent the flotation collar from inverting. In either case the water comes in contact with the consumable and the non-consumable dispersants by entering the underwater side of the flotation dispenser 40. Thus, in this example the dispensing cartridge 60 comprises a container having a first end containing a non-water consumable water dispersant 66a and a second end containing a water consumable dispersant 59 with both the water consumable water dispersant and the non-water consumable dispersant located below a water line when the flotation dispenser is located in a body of water in order to dispense material into the body of water.

Figure 12:
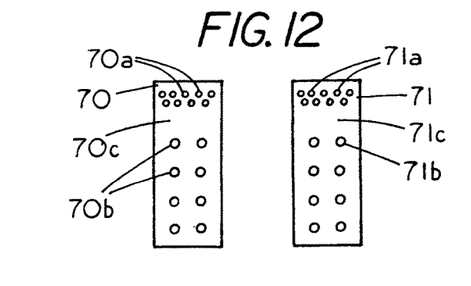
FIG. 12 is a front view of a set of cartridges for use in a flotation dispenser.
Figure 12A:
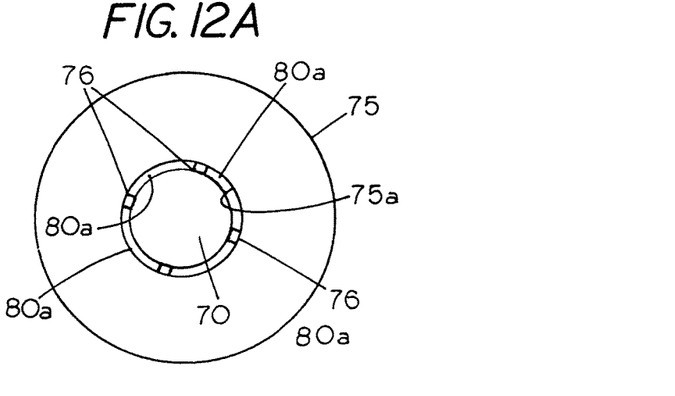
FIG. 12A is a top view of a flotation dispenser without a dispenser cartridge therein.

FIG. 12 shows a set of dispensing cartridges 70 and 71 having the same shape but not necessarily the same dispersants or the same weight. That is, dispensing cartridge 70 may have a weight $W_1$ when in the filled state and dispensing cartridge 71 may have a weight $W_2$ when in the filled state where $W_1$ and $W_2$ are not equal but either cartridge may be used with the flotation dispenser 75 shown in FIG. 12A. In the example shown the first cartridge 70 includes a cylindrical surface 70c with water ports 70b therein and similarly the second cartridge 71 include a cylindrical surface 71c with water ports 71b therein. FIG. 12A shows an example of a spherical floatation dispenser 75 for receiving and supporting either dispensing cartridge 70 or 71. Flotation dispenser 75 includes a set of radial extensions 76 that extend radially inward from cylindrical side wall 75a to provide a central support for either dispensing cartridge 70 or dispensing cartridge 71 as well as provide a set of axial fluid passages 80a between the cylindrical surface 75a and the exterior cylindrical surface 70c of dispensing cartridge 70 or the exterior cylindrical surface 71c of dispensing cartridge 71 to enable the water supporting the flotation dispenser to enter the underside of the flotation dispenser and come into contact with the dispersants within the dispensing cartridges. In this example the flotation dispenser 75 contains spacers 76 to maintain the axial fluid passages proximate the dispensing cartridge 70 or 71 so that the water supporting the floatation dispenser 75 can contact the dispersants within the dispensing cartridges as they are supported by the flotation dispenser 75. The feature of having interchangeable dispensing cartridges that have different weights, one which causes the flotation dispenser 40 to sink when placed in a body of water and one that does not allows one to use the same flotation dispenser 40 to provide for either two stage or three stage operation.

Figure 13:
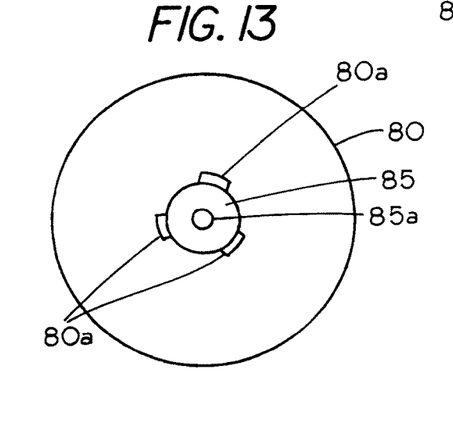
FIG. 13 is a top view of a flotation dispenser with a dispenser cartridge therein.

FIG. 13 shows an example of another flotation dispenser 80 wherein a set of three axial fluid passages 80a are located in the flotation dispenser 80 to support a dispensing cartridge 85a therein with the dispensing cartridge 85 having a water port 85a on the end of the dispensing cartridge 85.

Figure 14:
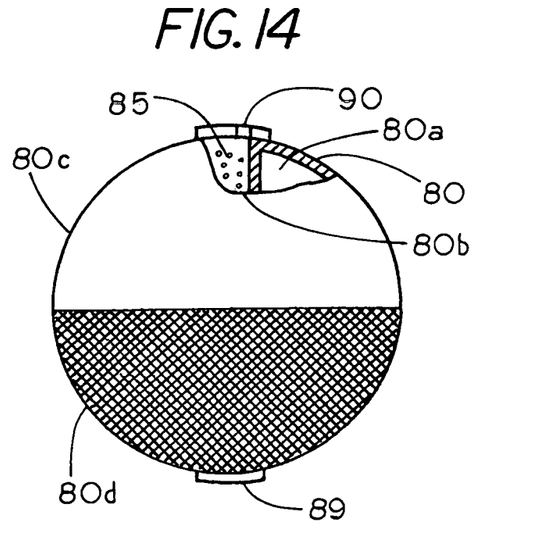
FIG. 14 is a partial side view of the flotation dispenser of FIG. 13.

FIG. 14 shows a partial cutaway view of a flotation dispenser 80 forming a flotation collar for a dispensing cartridge 85 with the dispensing cartridge 80 axially maintained within a central passage of the flotation dispenser 80 through a fastener comprising a first elongated end member 90 secured to one end of the cartridge and a second elongated end member 89 secured to the opposite end of the dispensing cartridge 84. In this example the flotation dispenser 80 has an annular flotation chamber 80a with the dispensing cartridge 85 removably mounted within a central passage 80b of the flotation dispenser 80.

Figure 17:
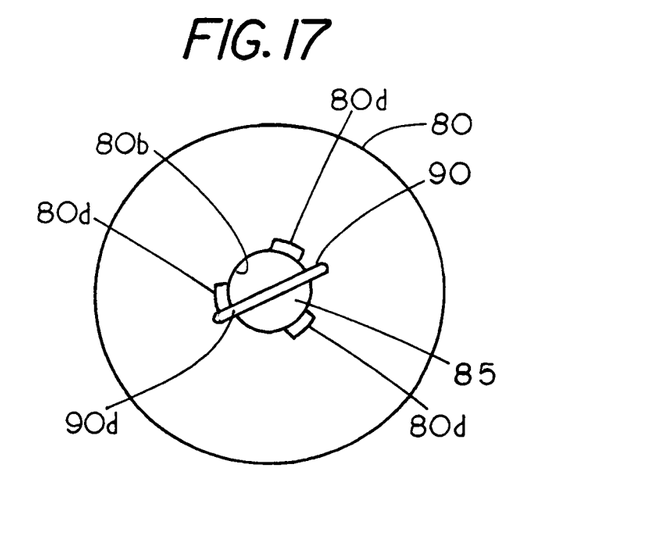
FIG. 17 is a top view showing a dispenser cartridge axially restrained within the flotation dispenser of FIG. 14.

FIG. 17 is a top view showing the floatation dispenser 80 having a cylindrical side wall 80b forming a central opening with dispensing cartridge 85 located therein and a set of three axial fluid passages 80d for allowing water access to the dispensing cartridge 85 located therein.

Figure 15:
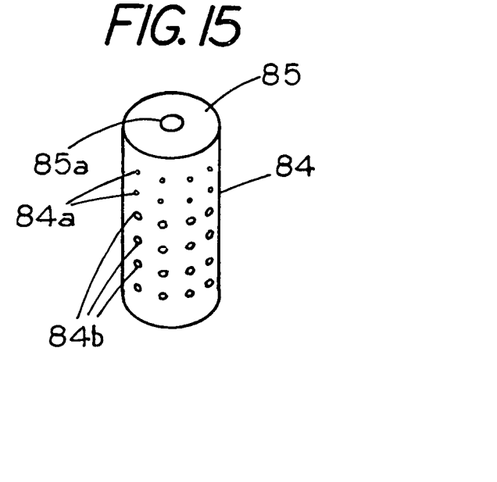
FIG. 15 is an isolated view of the dispenser cartridge located in the flotation dispenser of FIG. 14.
Figure 16:
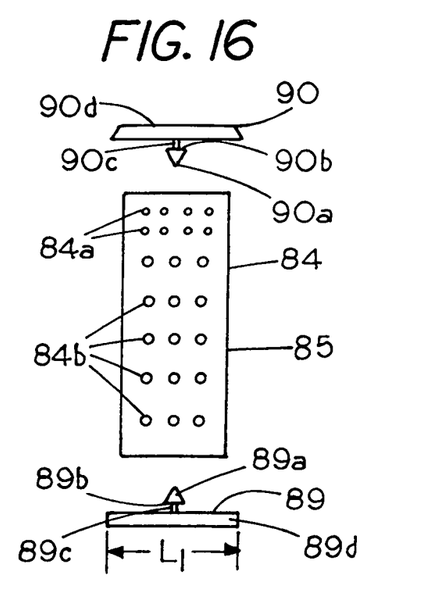
FIG. 16 is an exploded view of a dispenser cartridge and a fastener for holding the dispenser cartridge in the flotation dispenser.

FIG. 15 shows a perspective-isolated view of dispensing cartridge 85 with side water ports 84a and 84b to provide water access to dispersants within the dispenser cartridge 85 when the dispensing cartridge is supported within a flotation dispenser 80. Dispensing cartridge 95 includes a hole 85a therein for use in securing the dispensing cartridge within a flotation dispenser. To appreciate the feature of a fastener for removable mounting of a dispensing cartridge within the flotation dispenser reference should be made to FIG. 16 which shows an exploded view of dispensing cartridge 85 with fastening member 90 located proximate one end of the cartridge housing 84 and fastening member 89 located proximate the opposite end of the cartridge housing 84 for retaining the dispensing cartridge 85 within the flotation dispenser 80 without interfering with water access to the ports 84a and 84b on the sidewall of dispensing cartridge 85.

Fastening member 89 comprises an elongated strip 89d having a length L, which is longer than the diameter of the central passage in the flotation dispenser 80, with a shaft 89c supporting a conical head 89a having an annular shoulder 89b. Similarly, fastening member 90 comprises an elongated strip 90d, which has a length longer than the diameter of the central passage in the flotation dispenser 80, and a shaft 90c supporting a conical head 90a having an annular shoulder 90b. In the example shown each of the elongated fastening members comprise polymer plastics, however, other materials may be used without departing from the spirit and scope of the invention. The fastening member 89 and 90 allow one to quickly secure the dispenser cartridge 85 within a flotation collar 80 by applying axial force to the elongated member. For example by applying an axial force to elongated member 90 one can force head 90a through the opening 85a (FIG. 15) wherein the relation ship between the diameter of the conical head and the opening provides an interference fit so that a force is required to insert the conical head 90a through the opening 85a in the top end of the cartridge 85. The annular should 90b resists withdrawal of the elongated member 90 thus maintaining the elongated member 90 as a stop since the length L is greater than the diameter of the opening in the flotation collar. The operation of the second elongated member 89 is identical in operation and will not be described, however when both elongated members 89 and 90 are secured to the end of the dispenser they form a fastener to retain the dispensing cartridge 84 within the flotation dispenser 80. The advantage of the use of elongated members is that the elongated members allow fluid to enter the axial passages within the flotation dispenser 80 since they do not block the fluid flow into the axial passages. To remove the dispensing cartridge 85 one can simply pull either the elongated member 89 or elongated member 90 free of the end of the dispensing cartridge 85 to allow the dispensing cartridge 85 to be removed from the flotation dispenser 80. While mechanical stops 89 and 90 have been shown as a fastener for securing the dispensing cartridge 85 within the flotation collar 80 other example of fasteners may include tabs on either the collar or the dispensing cartridge. In still other examples of fasteners threads may be used to removably and rotationally secure the dispensing cartridge within the floatation dispenser without departing from the spirit and scope of the invention.

FIG. 17 is a top view of dispensing cartridge 80 located in an axially retained position in floatation collar 90. The fastening member 90 is shown in engagement with dispensing cartridge 95. In this example the conical head 90a has been forced through the opening 85a (FIG. 15) in the dispensing cartridge to mechanically engage the end of the dispensing cartridge 85. As can be seen in FIG. 17 the fastening member 90 limits the downward displacement of the dispensing cartridge within the flotation collar 80. Similarly, the fastening member 89, which fastens to the opposite end of the dispensing cartridge limits the upward displacement of cartridge 85 within collar 80.

Thus the fastening member 89 and fastening member 90 form a fastener for maintaining the dispensing cartridge 85 in an operative condition within the flotation dispenser 80. Fastening member 89 and 90 are preferably made from a hand ruptureable material so one can pull the elongated member free of the dispensing cartridge 85 when one needs to remove the spent dispensing cartridge 85 from the flotation dispenser 80.

The examples of flotation dispensers shown in the drawings reveal a flotation dispenser that forms a flotation collar and a cartridge that is removably mounted in a central passage within the flotation collar to allow a spent cartridge to be replaced with a fresh cartridge.

A feature of the flotation dispensers described herein is the use of replaceable cartridges, which contain different dispersants and are interchangeable with each other enabling an exchange of a cartridge to change the performance of the flotation dispenser as well as provide visual alerts to the status of the dispersant in the flotation dispenser. Consequently, based on the characteristics of the selected cartridge, which is mounted in the flotation collar formed by the flotation dispenser one can have a flotation dispenser that can function as either a two-stage dispenser or a three-stage dispenser. FIG. 5 and FIG. 6 illustrate the two-stage dispenser and the FIG. 4, FIG. 5 and FIG. 6 illustrate the three-stage dispenser. The selection of a particular cartridge for the type of dispersants allows the flotation dispenser to provide unique indicators of the status of the dispersant delivered to the body of water even though the characteristics of the flotation dispenser remain the same.

In the two-stage mode the dispensing cartridge and the flotation collar create a flotation dispenser that can simultaneously dispense two different water treatment materials such as a halogen and metal ions and provide an indication when one or both of the water treatment materials are consumed. In the first stage of the two stage mode the flotation dispenser floats in an upright condition indicating that the water treatment material in the flotation dispenser are being delivered to the body of water.

FIG. 5 shows a flotation dispenser 40 floating in a first condition with a light color end of hemisphere 40b above the water line and a dark color end of hemisphere 40a below the water line 11. This condition corresponds to the first stage in a two-stage mode.

In the second stage of the two stage mode the flotation dispenser 40 inverts as shown in FIG. 6 with the end of dark color hemisphere 40a located above the water line and the end of the light colored section 40b located below the water line to indicate that at least one of the water treatment materials has been consumed and that the cartridge in the flotation dispenser should be replaced with a fresh cartridge.

The purpose of the different color end sections is to provide a visual indication that one or both of the dispersants within the flotation dispenser have been consumed and should be replaced. That is, in some cases the water life i.e. the length of time the dispersant is effective, of the non-consumable dispersant may be matched to the water life of the consumable dispersant so both are replaced at the same time. In other examples the water life of the non-consumable dispersant may have a longer water life than the consumable dispersant so that only the consumable dispersant will be replaced. In such examples separate cartridges or cartridges that are detachable from each other may be used to hold the dispersants.

In operation of the flotation dispenser in the two-stage mode one may use a dispenser cartridge containing a first non-consumable dispersant, such as a source of metal ions, in an upper portion of the dispensing cartridge and a consumable dispersant, such as a halogen in the lower portion of the dispensing cartridge as illustrated in FIG. 7. An alternate arrangement is illustrated in FIG. 1 wherein the non-consumable dispersant is in a separate cartridge from the consumable dispersant. The embodiment of FIG. 1 may be used where it is anticipated that the non-consumable dispersant may have a longer dispensing life or water life than the consumable dispersant. If the dispensing life of the consumable dispersant and the non-consumable dispersant are approximately the same it may be preferred to use a single dispenser as illustrated in FIG. 7. In either condition the non water consumable dispersant, which is typically a source of metal ions, maintains its weigh during the dispensing phase while the water consumable dispersant decreases in weight as it is dispersed into the body of water. In the initial state the water consumable dispersant has a weight which is greater than the weight of the non water consumable dispersant when the dispenser cartridge is installed in the flotation dispenser which causes the flotation dispenser to float in a first orientation (see FIG. 5) until such time the weight of the consumable dispersant is equal to or less than the weight of the non water consumable dispersant which causes the center of gravity of the flotation dispenser to shift causing the flotation dispenser to invert 180 degrees (see FIG. 6) thus alerting an operator that the consumable dispersant is either spent or that it is spent and that the cartridge must be replaced.

In the operation of the flotation dispenser in the two-stage mode the weight of the cartridges are matched to the flotation capacity of the flotation dispenser. Normally, in the two stage mode F, which is the buoyancy force of the flotation dispenser in a submerged state, is greater than W1+W2+W3 where, $W_1$ is the weight of the non-consumable dispersant such as a mineral dispersant in the top compartment, $W_2$ is the weight of the water consumable dispersant such as a halogen dispersant which is in an undissolved state in the bottom compartment and $W_3$ is the weight of the dispenser cartridges that support the dispersants.

The above two-stage relationship causes the flotation dispenser 40, as shown in FIG. 5, to float in a first condition with the dispenser light side 40b visible above the water line. When the consumable dispersant is dispensed into the body of water the weight $W_2$ of the water consumable material decreases until $W_2$ is less than $W_3$ which changes the center of gravity of the flotation dispenser 40 causing the heavier top compartment containing the non consumable dispersant to become the bottom compartment. The results is illustrated in FIG. 6 where the light color surface 40b of flotation dispenser 40 is now below the water line 11 and the dark color surface 40a of flotation dispenser 40 is above the water line. Thus in the two stage mode of operation the weight of the dispenser cartridges and there contents is less than the buoyancy force F so that the flotation dispenser is maintained in a floating condition as shown in FIG. 5 and FIG. 6.

In the three stage mode of operation the relationship of the weight of the cartridge in the full or the spent condition as well as the buoyancy force of the flotation dispenser are selected to enable the flotation dispenser to function in as a three stage mode by merely selection the appropriate dispensing cartridge. This feature allows one to use the flotation dispenser with different dispersants and have the position of the dispenser with respect to a water line indicate the status of the dispersant therein.

In the first stage of the three stage mode the buoyancy force F of the flotation collar is insufficient to support the combined weight of the mineral dispersant, the dispenser cartridge and the weight of the halogen dispersant thereby causing the flotation collar to sink as illustrated in FIG. 4. That is the negative buoyancy forces $-F_1$ of the dispensing cartridges and the dispersants are greater than the positive buoyancy force F of the flotation dispenser. Thus when a buoyancy force of the flotation dispenser is insufficient to floatingly support the flotation dispenser and the dispenser cartridges in a full condition the flotation dispenser sinks and remain in a submerged condition (FIG. 4) until sufficient water consumable dispersant has been consumed to enable the buoyancy force of the flotation dispenser to exceed the weight of the dispenser cartridges and their contents.

As the consumable dispersant within the dispensing cartridge carried by the flotation dispenser 40 is water consumed the weight of the consumable dispersant lessens until it reaches a point where $-F_1$ is less than F causing the flotation dispenser 40 and the dispensing cartridge and their contents to rise from a submerged condition to the second stage where the flotation dispenser 40 floats partially above the water line as illustrated in FIG. 5. In the example shown in FIG. 5 the weight of the consumable dispersant is sufficiently great in relation to the weight of the non-water consumable dispersant so that the dispensing cartridge has a bias for floating in an upright condition thus causing the flotation dispenser 40 to float with end surface 40b at least partially above the water line.

As the water consumable dispersant dissipates from the cartridge it reaches a point where the orientation of the flotation dispenser 40 changes since the top heavy non consumable dispersant, which has a center of mass located above the geometric center of the flotation dispenser 40, causes the flotation dispenser to invert 180 degrees as shown in FIG. 6 thereby bringing the colored surface 40a above the water line 11 which providing a visual indictor that a water consumable dispersant therein is spent and the dispensing cartridge should be replaced.

FIG. 12 shows two cartridges 70 and 71 for placement in a flotation dispenser with the two dispensing cartridges having different buoyancy $-F_2$ and $-F_3$ with the flotation dispenser 40 having a buoyancy force F. By selection of the cartridge 70 which has a negative buoyancy force F, that is greater than the positive buoyancy force F of the floatation collar one finds that $-F_2+F$ is less than zero thus causing the flotation dispenser 40 and cartridges therein to sink as shown in FIG. 4. Thus cartridge 70 allows the flotation dispenser 70 to be used in a three-stage mode illustrated by FIG. 4, FIG. 5 and FIG. 6.

On the other hand if one desires to use the flotation dispenser in a two stage mode one select dispensing cartridge 71 where the negative buoyancy force $F_3$ of the dispensing cartridge is less than the positive buoyancy force F of the flotation dispenser 40. In this condition the flotation dispenser therein will float in the upright condition as illustrated in FIG. 5. As the water consumable dispersants within the dispensing cartridge carried by the flotation dispenser are consumed the flotation dispenser 40 inverts as illustrated in FIG. 6 thus exposing the color surface 40a above the water line 11 to thereby alert an operator of the time to replace the dispenser cartridge therein.

Thus a feature of the invention is that the same flotation dispenser 40 may be used in either a two-stage mode or a three-stage mode by selection of the appropriate dispensing cartridge.

A feature of the invention is that in the three-stage mode one of the modes can be used to indicate that a third dispersant has been consumed where the third dispersant is a dispersant that requires only periodic application rather than continual application such as water sanitizers.

Thus by having a flotation dispenser 40 to include a first surface that remains at least partially above a water line, for example 40b, when the weight of the water consumable dispersant is greater than the weight of the non-water consumable dispersant and a second surface, for example 40a, visually different from the first surface that remains at least partially above a water line when the water consumable dispersant has been consumed one can provide a visual indication to replace the water consumable dispersant as the flotation dispenser 40 floats in a body of water.

Thus it can be appreciated that the use of one type of cartridge in the flotation dispenser can be used to create a flotation dispenser that can simultaneously dispense two or more different water treatment materials such as a halogen and metal ions as well as provide an indication when one of the dispersants is nearing a condition when the dispersant therein should be replaced or is at a condition where the dispersant should be replaced.

While the invention has been described in relation to replaceable cartridges it is envisioned that one may want the cartridges for containing the dispersants to be fixedly formed in the cartridge chamber which, is centrally located in the flotation dispenser. In such cases the flotation dispenser would be discarded or recycled and replaced with a new flotation dispenser containing fresh dispersants.

Preferable the flotation dispenser as well as the cartridges therein are made from a polymer plastic, however, other materials may be used without departing from the spirit and scope of the invention. For example, the material for the flotation dispenser and the cartridges may be made from material having a specify gravity less than one.

As shown in the drawings the flotation dispensers 10, 30 and 40, which contain a first container with a non-consumable dispersant and a second container with a water-consumable dispersant with both containers located along the central axis and with both containers having dispersants with a specific of gravity greater than one. In operation of the invention the weight of the water consumable dispersant exceeds the weight of the first container with the non-consumable dispersant and the total weight of the first water container with the non-consumable dispersant and the second container with the water consumable dispersant is either less than a buoyancy force of the flotation dispenser or greater than the buoyancy force of the floating dispenser.

In one mode the invention comprises a multi-stage floatation dispenser for delivering at least one dissolvable dispersant to a body of water with the dispenser comprising a support shell having a central axis, a cylindrical sleeve having a cylindrical opening extending along the central axis and an annular flotation chamber located in the spherical shell to provide a buoyancy force to the dispenser. Carried by the floatation dispenser is a first container for a water dispersant that retains its mass when in contact with the body of water with the first container located in the cylindrical opening and a second container containing a further water dispersant with the further water dispersant comprising a dissolvable dispersant with the first container and the second container located along the central axis of the dispenser. The dispenser having a first stage where the dispersant and the further dispersant have a total weight greater than the buoyancy force when the further water dispersant is in an undissolved state causing the dispenser, the dispersant and the further dispersant to sink to the bottom of the body of water. The dispenser having a second stage wherein the dispersant and the further dispersant have a total weight less than the buoyancy force as a result of dissolving of the further water dispersant thereby causing the dispenser to float in a first orientation with a portion of the dispenser visible above a water line to thereby provide a visual indication that one can expect to replace the dispenser in the near future. The dispenser having a third stage whereby by the dissolving of the further dispersant changes the center of gravity of the dispenser causing the dispenser to invert thereby providing a further visual indication to either replace the dispenser or to place a fresh charge of the further dispersant into the dispenser.

The invention further includes method of delivering two or more dispersants to a body of water through a flotation dispenser by placing a non-water consumable dispersant in the flotation dispenser and a water consumable dispersant in a cartridge while positioning the cartridge axially below the non-water consumable dispersant in the flotation dispenser with the water consumable dispersant having a weight greater than a weight of the non-water consumable dispersant. Next one places the flotation dispenser with the water consumable dispersant and the non-water consumable dispersant in the body of water wherein the weight of the water consumable dispersant in a consumed state is insufficient to maintain the flotation dispenser in a submerged condition. One may want to place the water consumable dispersant in a replaceable cartridge that is removable from the flotation dispenser to enable replacement of the replaceable cartridge in the flotation dispenser when the water consumable dispersant therein has been consumed without having to replace the non-water consumable dispersant in the floatation dispenser. In addition one may include the step of spacing the replaceable cartridge from a wall of the flotation dispenser to provide a water passage therebetween for directing water to a water port of the replaceable cartridge from an underside of the floatation dispenser.

I claim:

1. A method of delivering two or more dispersants to a body of water through a flotation dispenser comprising: placing a first non-water consumable dispersant in the flotation dispenser; placing a water consumable dispersant in a cartridge with the cartridge axially below the non-water consumable dispersant in the flotation dispenser with the water consumable dispersant having a weight greater than a weight of the non-water consumable dispersant; and placing the flotation dispenser with the water consumable dispersant and the non-water consumable dispersant in the body of water wherein the weight of the water consumable dispersant in a consumed state is insufficient to maintain the flotation dispenser in a submerged condition.

2. The method of claim 1 including a step of placing the water consumable dispersant in a replaceable cartridge that is removable from the flotation dispenser to enable replacement of the replaceable cartridge in the flotation dispenser when the water consumable dispersant therein has been consumed without having to replace the non-water consumable dispersant in the floatation dispenser.

3. The method of claim 2 including a step of spacing the replaceable cartridge from a wall of the flotation dispenser to provide a water passage therebetween for directing water to a water port of the replaceable cartridge from an underside of the floatation dispenser.

* * * * *